Feb. 18, 1969   V. CLAPSADDLE   3,428,326
PANEL MOUNTING CONSTRUCTION
Filed July 11, 1967
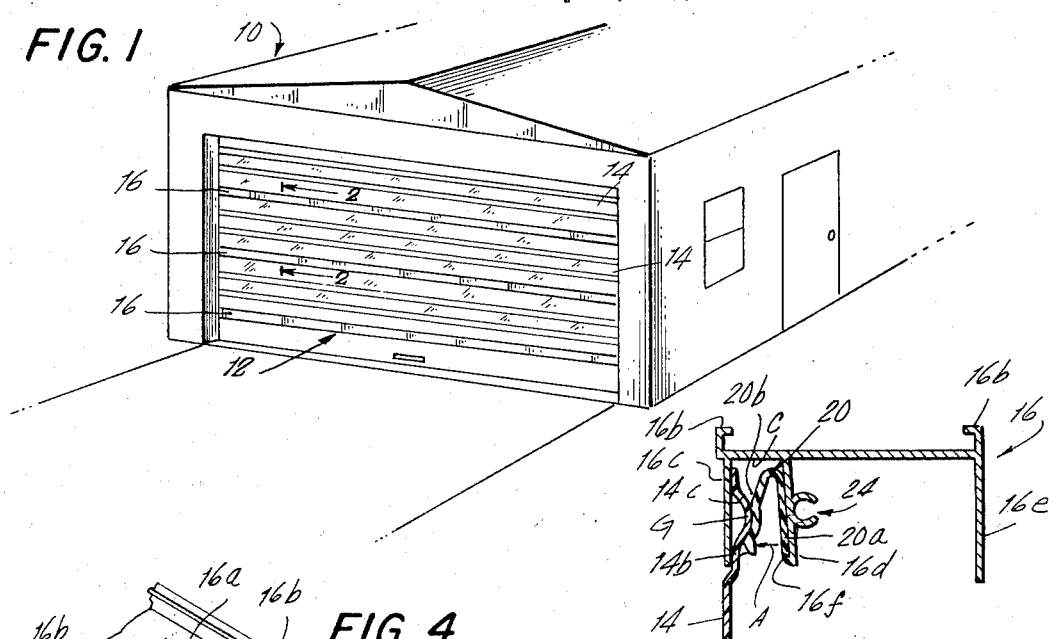
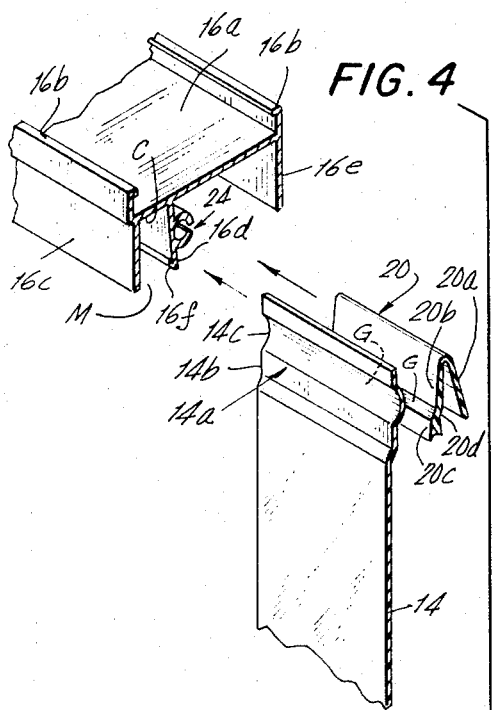
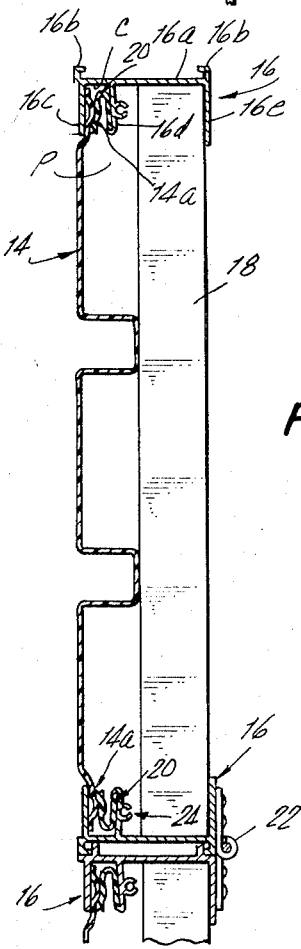
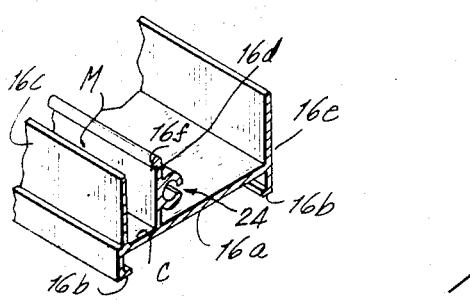
INVENTOR.
VICTOR CLAPSADDLE
Amster & Rothstein
ATTORNEYS

United States Patent Office 3,428,326
Patented Feb. 18, 1969

3,428,326
PANEL MOUNTING CONSTRUCTION
Victor Clapsaddle, Massapequa, N.Y., assignor to North American Winfield Door Corp., Lindenhurst, N.Y., a corporation of New York
Filed July 11, 1967, Ser. No. 652,533
U.S. Cl. 52—502　　2 Claims
Int. Cl. E06b *3/58;* E04f *15/14*

ABSTRACT OF THE DISCLOSURE

A construction for mounting a panel in an opening of an overhead garage door or similar structure wherein the panel is extruded in a shape providing a gripping surface along each of two opposite edges and these edges are each extended into a mounting compartment bounding the panel opening which also accommodates a resilient mounting clip that is effective to engage each panel edge gripping surface to firmly hold the panel in place.

---

The present invention relates generally to panel mounting constructions, and more particularly to improvements in the construction bounding a panel opening and in the panel itself which cooperate to readily permit firmly mounting the panel in place.

Extruded plastic panels are commonly embodied in overhead garage doors, to mention but one popular end use that capitalizes on the numerous noteworthy physical properties of plastic as a construction material. The panel, more particularly, is mounted in an opening in the door and has excellent performance in that it is resistant to weather, it can be translucent if some light transmission is desired, it is economically mass produced and it possesses numerous other desirable properties. The only shortcoming is the inability to firmly hold the panel in place while at the same time having a simple, uncomplicated method of assembling or mounting the panel on the door. Thus, the obviously available procedure of bolting or similarly uniting the panel to the door would provide a desirable firm mounting for the panel, but this procedure increases manufacturing and assembling costs. Presently known panel mounting constructions thus avoid the use of bolts and threaded members, but they consequently are not entirely satisfactory in preventing inadvertent disengagement of the panel from its support.

Broadly, it is an object of the present invention to provide an improved panel mounting construction overcoming the foregoing and other shortcomings of the prior art. Specifically, it is an object to provide a panel adapted to be firmly mounted in place with a resilient clip and wherein the assembly of the panel and clip is readily and easily achieved. Both the panel and the clip are advantageously economically fabricated as extrusions and, consistent with this method of fabrication, each is provided with a cooperating shaped gripping surface which in the assembled condition of these members interlocks to firmly mount the panel in place.

A panel mounting construction demonstrating objects and advantages of the present invention includes a door or similar support provided with a pair of mounting compartments bounding opposite edges of a panel opening. A panel having a first gripping surface extruded along each of two opposite edges is positioned in the panel opening with said opposite edges extended into the mounting compartments. A resilient clip, also an extruded product and having a second gripping surface thereon, is positioned in each mounting compartment with the first and second gripping surfaces interlocked with each other to firmly hold the panel in place.

The above brief description as well as further objects, features and advantages of the present invention, will be more fully appreciated by reference to the following detailed description of a presently preferred, but nonetheless illustrative, embodiment in accordance with the present invention, when taken in conjunction wtih the accompanying drawings, wherein:

FIG. 1 is a partial perspective view of a building structure having a door formed with panels held in place by a panel mounting construction demonstrating objects and advantages of the present invention;

FIG. 2 is an elevational view on an enlarged scale, in section taken on line 2—2 of FIG. 1, illustrating structural details of the panel mounting construction;

FIG. 3 is a partial elevational view, on an enlarged scale and in section, similar to FIG. 2 showing further structural details; and FIG. 4 is an exploded perspective view best illustrating a method of positioning the panel within the mounting construction.

Reference is now made to the drawings wherein there is shown a garage 10 or similar building construction having an overhead door 12 comprised of a plurality of panels 14, preferably of plastic and economically mass produced as extrusions. Each panel 14 is mounted between rails 16 embodied in the door construction, the details of the panel mounting construction being the essence of the present invention. Moreover, although illustrated herein in connection with an overhead garage door 12, it will be understood that the present invention is not specifically limited to this use and may advantageously be employed wherever it is desired to mount a panel in an opening of a support wall or structure.

Specifically, and as best shown in FIG. 2, the construction of the door 12 includes, as previously noted, a pair of top and bottom rails 16 which are appropriately connected at opposite ends of a vertical brace 18. Each rail 16 is preferably an aluminum extrusion extending the entire width of the door 12 and includes a horizontal wall 16a having sealing lips 16b at opposite ends extending in one direction therefrom and a series of three vertical walls 16c, 16d and 16e extending in the opposite direction therefrom. The two walls 16c and 16d cooperate to form an elongated compartment C having a mounting opening M which bounds the opposite sides of the larger panel opening P which is defined between adjacent pairs of rails 16. Each panel 14, preferably extruded with a corrugated cross sectional shape as illustrated, is mounted in a panel opening P with opposite marginal edges 14a extended through the mounting opening M and into each of the compartments C. Also disposed in each compartment C is a mounting clip 20 which engages the panel edge 14a and is effective to securely hold the panel 14 in place.

As best shown in the enlarged scale illustrations of FIGS. 3, 4, wall 16d has a laterally extending hook-like projection 16f formed along its edge bounding the mounting opening M, which projection forms a seat for the mounting clip 20. That is, the mounting clip 20, preferably fabricated of a resilient plastic of U-shaped cross section by extrusion, is mounted in the compartment C so that the free end of one leg 20a is seated in the shoulder provided by the seat 16f. The other leg 20b is extruded with a configuration or shape as illustrated, wherein the terminal portion 20c is joined by an angled or inclined intermediate section 20d to the main leg section 20b. This arrangement of the leg portions 20c, 20d, and 20b forms an inclined gripping surface G on the mounting clip 20, the function of which will soon be apparent.

As previously noted, each panel 14 is preferably fabricated as an economically produced plastic extrusion in which the opposite edges 14a are provided with a shape complementary to the shape of the mounting clip leg 20b. That is, as best shown in FIGS. 3, 4, along the panel edges 14a there are sections 14b, 14c laterally displaced from the plane of the main body of the panel such that at the juncture of the sections 14b and 14c there is formed a gripping surface or coextensive projection G which, in practice, cooperates with the gripping surface or coextensive seat G on the mounting clip 20 to minimize inadvertent disengagement of the panel edges 14a from the compartment C. This is best seen in FIG. 3 illustrating the operative position of the mounting clip 20 within the compartment C wherein the leg 20 is engaged in the seat 16f on the wall 16e and the other mounting clip leg urged against the panel edge 14a in the direction A by a force produced by the resiliency of the plastic material of construction of the clip 20. As a consequence, the shaped gripping surfaces G of the panel edge 14a and mounting clip 20 are in gripping engagement with each other preventing vertical movement of each panel edge 14a from each compartment C. However, the coaction of the respective gripping surfaces G is such that horizontal movement of the panel 14 relative to the clip 20 is possible and, in fact, may be utilized to initially mount each panel 14 in a panel opening P. That is, a panel 14 with mounting clips 20 properly in position along the opposite panel edges 14a may be introduced in a horizontal direction from one side of the rail 16 and moved into place along the entire length of the rail 16. Alternatively, either the panel 14 or the clip 20 may first be introduced and set in place within a compartment 20, and then the other member subsequently moved horizontally into place within the compartment.

Completing the construction of the door 12 are hinges 22 having hinge plates which are respectively connected to the wall 16e of an adjacent pair of rails 16. This hinge connection, in a well understood manner, permits the door 12 to be moved into an out-of-the-way overhead open position with respect to the opening into the garage 10 and also in a reverse direction into its closed position, as illustrated in FIG. 1. In its closed position, the sealing lips 16b of an adjacent pair of rails 16 sealingly engage with each other in a well understood manner.

In the embodiment of the rail 16 illustrated herein an appropriate circular extruded shape 24 is provided on the wall 16d to accommodate bolts (not shown) for a capping structure (also not shown) which, in practice, is provided along the opposite vertical edges of the door 12. These structural features have been omitted since they do not form a part of the present invention nor are they necessary for an understanding of the present invention. However, from what has been described, it should be readily appreciated that the cooperating panel mounting construction C, 20 and 14a readily provides a firm mounting of a panel within the opening P of a support structure such as the door panel 12 illustrated herein.

A latitude of modification, change and substitution is intended in the foregoing disclosure and in some instances some features of the invention will be employed without a corresponding use of other features.

What is claimed is:

1. A panel construction comprising at least one pair of panel-holding rails arranged in facing relation to each other so as to define a panel opening therebetween, each said rail having formed therealong spaced parallel walls bounding a compartment having an elongated mounting opening facing said panel opening, a lateral projection on one of said walls, adjacent the free edges thereof forming a seat in said compartment mounting opening, a panel disposed in said panel opening having opposite edges thereon extended into each said compartment mounting opening, each said panel edge having a coextensive projection forming a first gripping surface thereon, and a resilient U-shaped mounting clip having an opening between extending legs thereof and adapted to exert a holding force in opposition to the closing of said opening, said clip being positioned in said compartment mounting opening with said opening thereof in an outwardly facing relation from said compartment and one leg thereof engaged in said seat of said compartment mounting opening and substantially coextensive therewith and the other leg having a coextensive seat thereon forming a second gripping surface and in holding engagement with the projection on said panel edge, whereby said first and second gripping surfaces interlock with each other such that disengagement of said panel from said panel opening is opposed by an increasing holding force exerted by said mounting clip.

2. A panel mounting construction as defined in claim 1 wherein said extruded mounting clip is formed of plastic having a resiliency of a sufficient extent to firmly bias said second gripping surface thereon against said first gripping surface of said panel.

References Cited

UNITED STATES PATENTS 3,310,923   3/1967   De Ridder _____ 52—502

FRANK L. ABBOTT, *Primary Examiner.*

S. D. BURKE, *Assistant Examiner.*

U.S. Cl. X.R.

52—397